(12) United States Patent
Goller et al.

(10) Patent No.: US 10,939,191 B2
(45) Date of Patent: Mar. 2, 2021

(54) LOUDSPEAKER AND MICROPHONE DEVICE

(71) Applicant: Bang & Olufsen A/S, Struer (DK)

(72) Inventors: Lars Goller, Herning (DK); Nikolaj Conradsen Vejen, Singapore (SG)

(73) Assignee: Bang & Olufsen A/S, Stuer (DK)

(*) Notice: Subject to any disclaimer, the term of this patent is extended or adjusted under 35 U.S.C. 154(b) by 56 days.

(21) Appl. No.: 15/382,572

(22) Filed: Dec. 16, 2016

(65) Prior Publication Data
US 2017/0180836 A1    Jun. 22, 2017

(30) Foreign Application Priority Data

Dec. 16, 2015 (DK) .............................. PA201500810

(51) Int. Cl.
| | |
|---|---|
| *H04R 1/02* | (2006.01) |
| *H04M 3/56* | (2006.01) |
| *H04M 1/03* | (2006.01) |
| *H04R 5/02* | (2006.01) |
| *H04R 5/027* | (2006.01) |
| *H04R 1/26* | (2006.01) |
| *H04M 1/62* | (2006.01) |

(52) U.S. Cl.
CPC .............. *H04R 1/025* (2013.01); *H04M 1/03* (2013.01); *H04M 3/56* (2013.01); *H04R 5/02* (2013.01); *H04R 5/027* (2013.01); *H04M 1/62* (2013.01); *H04R 1/023* (2013.01); *H04R 1/26* (2013.01); *H04R 2420/09* (2013.01)

(58) Field of Classification Search
CPC .......... H04R 5/02; H04R 5/027; H04R 1/023; H04R 1/26; H04R 2420/09; H04R 1/025; H04M 1/03; H04M 1/62; H04M 3/56
USPC .................................................. 381/332, 336
See application file for complete search history.

(56) References Cited

U.S. PATENT DOCUMENTS

| | | | | |
|---|---|---|---|---|
| 4,078,155 A | * | 3/1978 | Botros ..................... | H04M 1/62 379/369 |
| 8,457,614 B2 | * | 6/2013 | Bernard ................... | H04M 3/56 455/416 |
| 9,521,475 B2 | * | 12/2016 | Lin .......................... | H04R 1/02 |
| 9,961,437 B2 | * | 5/2018 | McLaughlin .......... | H04R 1/406 |

(Continued)

*Primary Examiner* — William A Jerez Lora
(74) *Attorney, Agent, or Firm* — The Law Offices of Eric W. Peterson

(57) ABSTRACT

A device for radiating sound energy into the surroundings and receiving sound energy from the surroundings, where the device comprises a housing having a top portion, a side portion and a bottom portion wherein a loudspeaker unit is provided in the top portion configured to generate sound energy in the surroundings of the device and where the housing is further provided with a microphone having an inlet portion, where the microphone is configured to receive sound energy from a sound reception region that is in acoustic communication with said surroundings of the device, wherein the sound reception region is provided adjacent the bottom portion of the housing, such that the inlet portion of the microphone faces away from the top portion of the device. In an embodiment the sound reception region is partially bounded by an inclined surface portion at the outer circumferential edge portion of the bottom portion, where the inclined surface portion preferably forms an angle α less than 45 degrees with the bottom portion.

19 Claims, 6 Drawing Sheets

(56) References Cited

U.S. PATENT DOCUMENTS

| | | | | |
|---|---|---|---|---|
| 2006/0104458 A1* | 5/2006 | Kenoyer | ............... | H04R 3/005 381/92 |
| 2006/0227963 A1* | 10/2006 | Bernard | ............... | H04M 1/725 379/388.01 |
| 2013/0177191 A1* | 7/2013 | Waguri | ................... | H04R 1/08 381/356 |
| 2015/0201260 A1* | 7/2015 | Oswald | ................ | B60N 2/879 381/86 |
| 2015/0245119 A1* | 8/2015 | Lin | ......................... | H04R 1/02 381/361 |
| 2016/0182986 A1* | 6/2016 | Choi | ...................... | H04R 5/02 381/365 |
| 2017/0105066 A1* | 4/2017 | McLaughlin | .......... | H04R 3/005 |

\* cited by examiner

LOUDSPEAKER AND MICROPHONE DEVICE

CROSS REFERENCE TO RELATED APPLICATION

This application claims priority to Danish Application Number PA 2015 00810, filed on Dec. 16, 2015, which is incorporated herein by reference in its entirety.

TECHNICAL FIELD

The present disclosure relates generally to devices that can be used for auditory communication, and more specifically to such devices designed for use in conference phone setups.

BACKGROUND

Auditory communication devices comprising a loudspeaker and a microphone enabling these devices to be used for instance in a setup for teleconferences are known in the art. Such prior art devices are typically provided with a microphone either at the top face of the device where the loudspeaker is also provided or at a side face of the device close to the top face. Such prior art devices often suffers from problems with acoustic feedback during use or from an unwanted directionality of the microphone.

SUMMARY

It would hence be advantageous to have access to a device that could for instance be used for teleconferences, with reduced problems of acoustic feedback during use, such that a larger microphone sensitivity and/or a larger acoustic output from the loudspeaker could be obtained during use of the device. Further, it would be advantageous to have access to a device for teleconference use that could pick up the speech of persons participating in the teleconference substantially equally well, no matter where the speakers were located relative to the device. The device could for instance be located at the middle of a table top and the speakers distributed around the table.

An object of the present disclosure is to provide a device that can be used for instance for teleconference purposes, where the device has reduced risk of acoustical feedback during use and hence increased microphone sensitivity and/or maximum acoustical output from the loudspeaker compared to prior art devices.

It is a further object of the disclosure to provide a device that can for instance be used for teleconference purposes, where the device has substantially the same microphone sensitivity (directional characteristics) in all directions at least in a region extending substantially along a surface, on which the device is standing during use hereof.

According to the present disclosure, a close to perfect omnidirectional microphone sensitivity in the frequency band of human speech can be obtained from one microphone by a special design of the sound reception region and a careful positioning of the microphone.

By using a special shape in the area where the microphone is positioned a greater tolerance against acoustical feedback can be obtained.

By placing the speaker drivers carefully and having their main lobes of energy pointing away from the microphone, further optimization of the quality of speech can be obtained.

The design of the device should preferably be round or oval to allow soundwaves to travel as undisturbed as possible around it.

The microphone provided in the device should be positioned on the surface opposing that of the loudspeaker, in an area angled upwards/away from the back or bottom side of the device to allow sound pressure to reach the microphone undisturbed in the frequency band of speech.

The angle relative to horizontal of the surface where the microphone is placed (the opposing surface of where the speaker driver are placed) is preferably less than 45 degrees.

It is understood that although the device in the following is described and claimed comprising a loudspeaker it would be possible to use more than just one loudspeaker, if this was deemed necessary or advantageous. Such devices would also fall within the scope of the disclosure.

It is further understood that although the device in the following is described and claimed comprising a microphone it would be possible to use more than just one microphone, provided such microphones were placed according to the principles of the disclosure, if the user of more than one microphone was deemed necessary or advantageous. Such devices would also fall within the scope of the disclosure.

According to a first aspect there is provided a device for radiating sound energy into the surroundings and receiving sound energy from the surroundings, where the device comprises:
  a housing having a top portion, a side portion and a bottom portion;
  a loudspeaker unit provided in the top portion configured to generate sound energy in the surroundings S of the device;
  a microphone having an inlet portion, which microphone is configured to receive sound energy from a sound reception region in acoustic communication with the surroundings S of the device;
  wherein said sound reception region is provided adjacent said bottom portion of the housing and partially bounded by an inclined surface portion of said housing, wherein said inclined surface portion faces away from said top portion, and wherein said inlet portion of the microphone is in acoustic communication with said inclined surface portion of the sound reception region, such that the sound energy can enter the microphone from the sound reception region.

In an embodiment of the first aspect, the inclined surface portion that faces away from said top portion forms an angle with the surface of the top portion, wherein said angle is greater than 90 degrees.

In an embodiment of the first aspect, the inclined surface portion is configured such that it connects the bottom portion with the side portion of the device.

In an embodiment of the first aspect, the inclined surface portion forms an angle α with the bottom portion, where angle α preferably is less than approximately 45 degrees. It may however be possible to use an inclined surface portion that forms an angle of more than 45 degrees with the bottom portion.

In an embodiment of the first aspect, the inlet portion of the microphone is provided in the inclined surface portion.

In an embodiment of the first aspect, the top portion is configured such that a cavity is formed in the housing, which cavity is in acoustic communication with the surroundings S of the device.

In an embodiment of the first aspect, the acoustic communication between the cavity and the surroundings S is formed by a plurality of openings or channels through a portion of the top portion of the housing.

In an embodiment of the first aspect, the top portion is provided with a cover, a part of which corresponding to the openings or channels is made sound permeable.

In an embodiment of the first aspect, the inclined surface portion extends circumferentially all the way around the bottom portion.

In an embodiment of the first aspect, the inclined surface portion extends circumferentially over one or more sub-portions around the bottom portion.

In an embodiment of the first aspect, the bottom portion is provided with a footing element extending a distance t outwardly from the bottom portion.

In an embodiment of the first aspect, t>0 and α is substantially equal to zero.

In an embodiment of the first aspect, the device comprises at least two microphones having respective inlet portions, which microphones are configured to receive sound energy from a sound reception region in acoustic communication with the surroundings S of the device.

In an embodiment of the first aspect, the inlet portions of the at least two microphones are provided in the inclined surface portion.

In an embodiment of the first aspect, at least one microphone is provided in the side wall of the footing element.

In an embodiment of the first aspect, the inlet portion of the microphone is a short tube providing acoustic communication between the sound reception region and the diaphragm or other sound sensitive means of the microphone.

In an embodiment of the first aspect, the inlet portion of the microphone is the microphone diaphragm, or sound sensitive means, of the microphone itself, such that the microphone diaphragm, or other sound sensitive means, is provided substantially in the inclined surface portion of the device.

According to a second aspect there is provided a system comprising at least two of the devices according to the first aspect including any embodiment hereof, wherein the devices are configured such that the respective sound reception regions of the at least two devices are located relative to each other in such a manner that the output signals from the respective microphones of the devices transmit a stereophonic or multi-channel signal that can be reproduced by means of a stereophonic or other multi-channel sound reproduction system at a reception region remote from the region in which said system is provided.

In an embodiment of the second aspect, the sound reproduction system at the reception region comprises two or more devices according to the first aspect including any embodiment hereof, the devices of the sound reproduction system configured to reproduce sound via a loudspeaker, loudspeakers, or high frequency loudspeaker provided in the two or more devices according to the first aspect including any embodiment hereof that are provided in the reception region.

In an embodiment of the second aspect, the devices are configures to transmit output signals from the respective microphones to said stereophonic or other multi-channel sound reproduction system in the reception region partly or completely by wireless communication means.

BRIEF DESCRIPTION OF THE DRAWINGS

Further benefits and advantages of the present disclosure will become apparent after reading the detailed description of non-limiting exemplary embodiments of the disclosure in conjunction with the accompanying drawings, wherein.

DETAILED DESCRIPTION

In the following a detailed description of example embodiments is given. It is, however understood that the principles of the disclosure could be embodied in other ways.

Figure 1A:
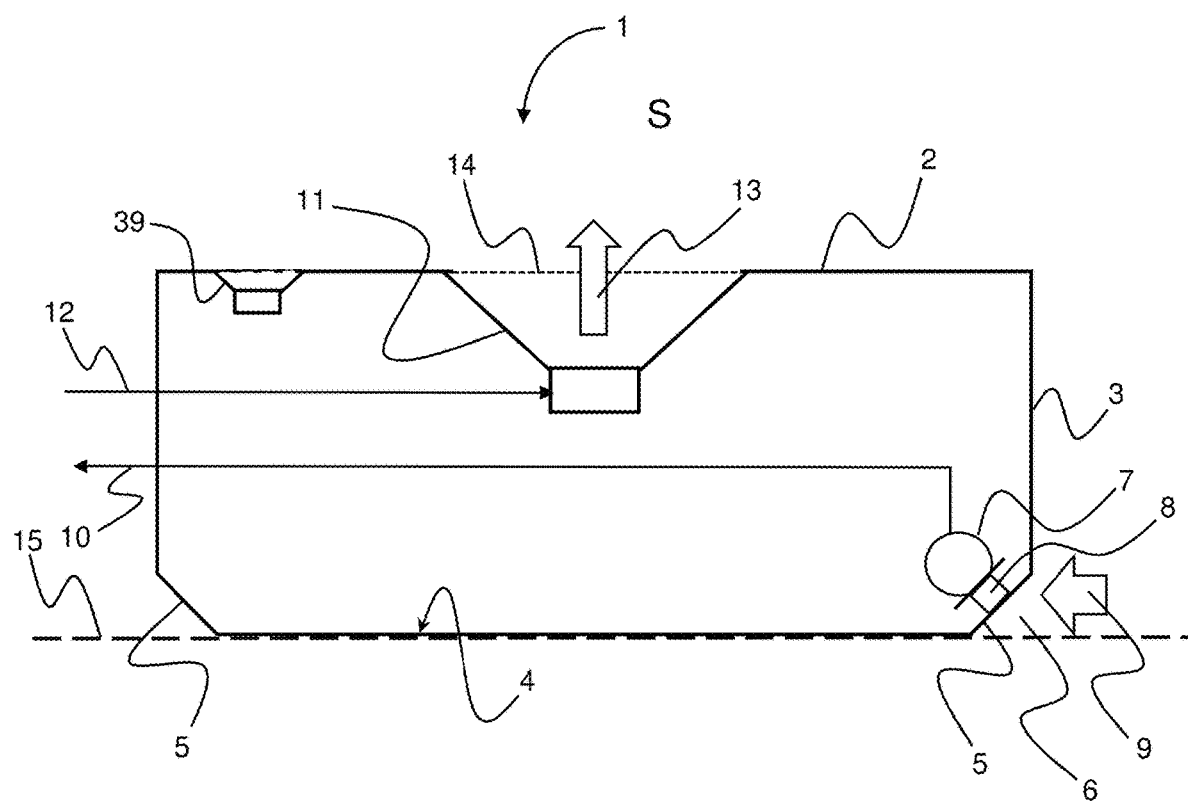
FIG. 1(a) shows a schematic cross sectional view of a device according to an exemplary embodiment.

With reference to FIG. 1(a) there is shown a schematic cross sectional view of an embodiment of a device illustrating the basic principles of the disclosure. The device generally indicated by reference numeral 1 comprises a housing provided with a top portion 2, side portions 3 and a bottom portion 4. Preferably, the top and bottom portions 2, 4 are either circular or oval, although other shapes may also be chosen. Inside the housing there is provided a loudspeaker 11 that radiates sound energy 13 into the surroundings S when provided with a suitable input signal 12. Through the top portion 2 of the housing there is provided a sound permeating portion 14, such that the diaphragm of the loudspeaker is protected while sound can still be emitted through the portion 14. Examples of possible configurations hereof are given in the following figures.

Figure 1B:
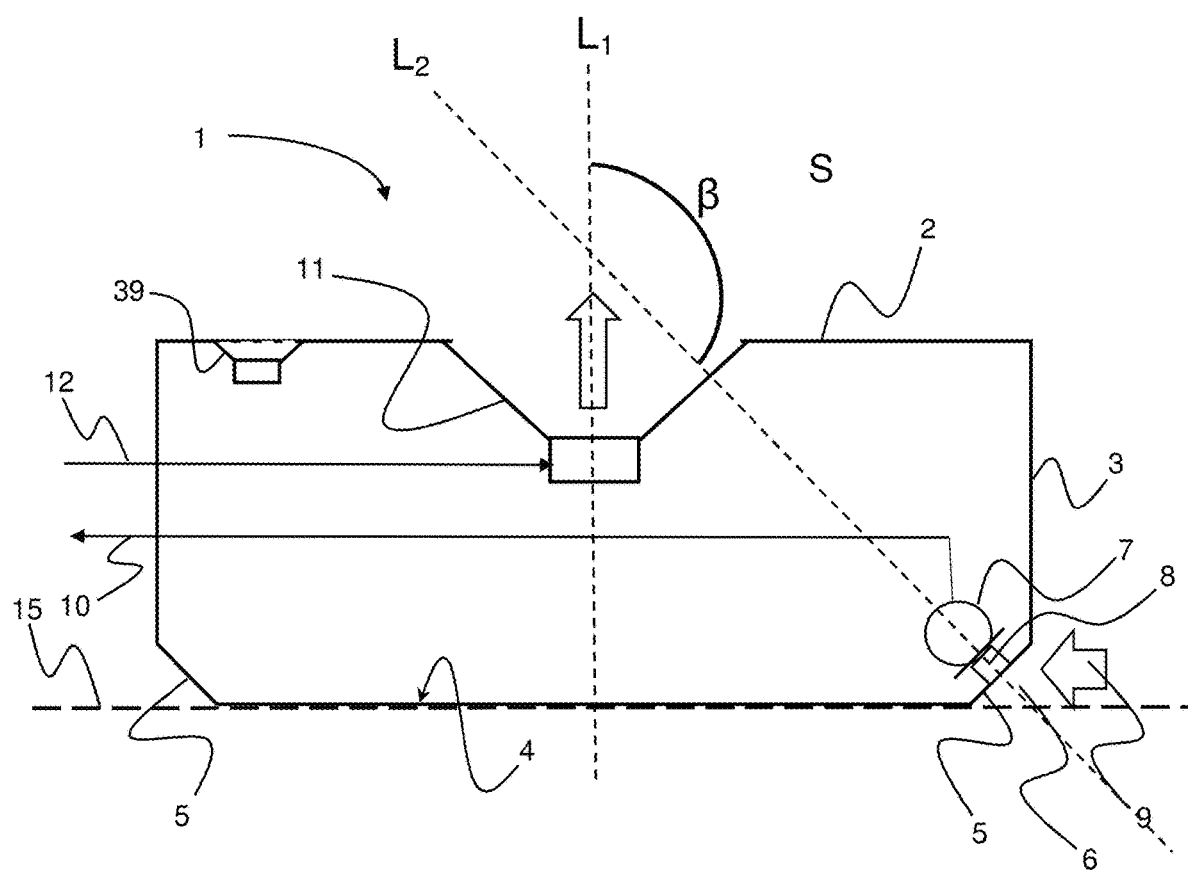
FIG. 1(b) shows a schematic cross sectional view of a device according to an exemplary embodiment.

In an embodiment, the loudspeaker 11, that is configured to handle mid and low frequencies is supplemented with a high frequency loudspeaker (tweeter) 39, also provided in the top portion 2. Preferably the tweeter 39 is mounted in the top portion 2 as far as possible from the inlet portion 8 of the microphone 7 in the sound reception region 6. In case two or more loudspeakers are provided in the housing, a suitable filter may be incorporated in the housing in order to route the mid/low frequencies and the high frequencies, respectively, of the input signal 12 to the loudspeaker that should reproduce these respective frequency regions. Such filter means are however not shown in FIG. 1.

Also provided in the housing there is a microphone 7 that receives sound energy 9 through an inlet portion 8. The inlet portion 8 can be any member capable of allowing sound energy 9 to pass to the microphone 7, for example, an opening, channel, passageway, or the like. When sound is picked up by the microphone 7 a corresponding electrical output signal 10 is provided by the microphone 7. The output signal 10 can be sent to a sound reproduction device, for example, a loudspeaker, or the like. It is noted that although FIGS. 1, 2, 4 and 5 show microphones 7 with an inlet portion 8 in the form of a short tube it would be possible to apply microphones 7 of other configurations as long as the inlet portion 8 to the microphone 7 is located in the sound reception region 6 formed between the bottom portion 4 and the side portion 3 of the housing.

Along the circumferential edge between the bottom portion 4 and the side portion 3 there is provided an inclined surface portion 5 connecting the bottom portion 4 with the side portion 3. The inclined surface portion 5 can face away from the top portion 2 of the housing, for example, with reference to FIG. 1(b), the inclined portion 5 can be positioned on a portion of the housing where the intersection of line L1, perpendicular with the surface of the top portion 2, and line L2, perpendicular with the surface of the inclined surface portion 5, creates an angle β greater than 90 degrees. The inlet portion 8 of the microphone 7 is provided in this inclined surface portion 5.

When the device 1 is placed on a surface, for instance a table top, as indicated by the broken line 15 in FIG. 1, a region is formed between the inclined surface portion 5 and the underlying surface 15. This region will be referred to as a sound reception region 6 in the following.

When located in the manner described above, the microphone 7 will have a substantially omnidirectional characteristic within the frequency band of human speech. Furthermore, due to the relative placement of the loudspeaker 11 opening in the top portion 2 of the housing and the microphone 7 in the sound reception region 6 at the bottom portion 4 of the device 1, the risk of acoustic feedback from the loudspeaker 11 to the microphone 7 will be reduced.

Figure 2:
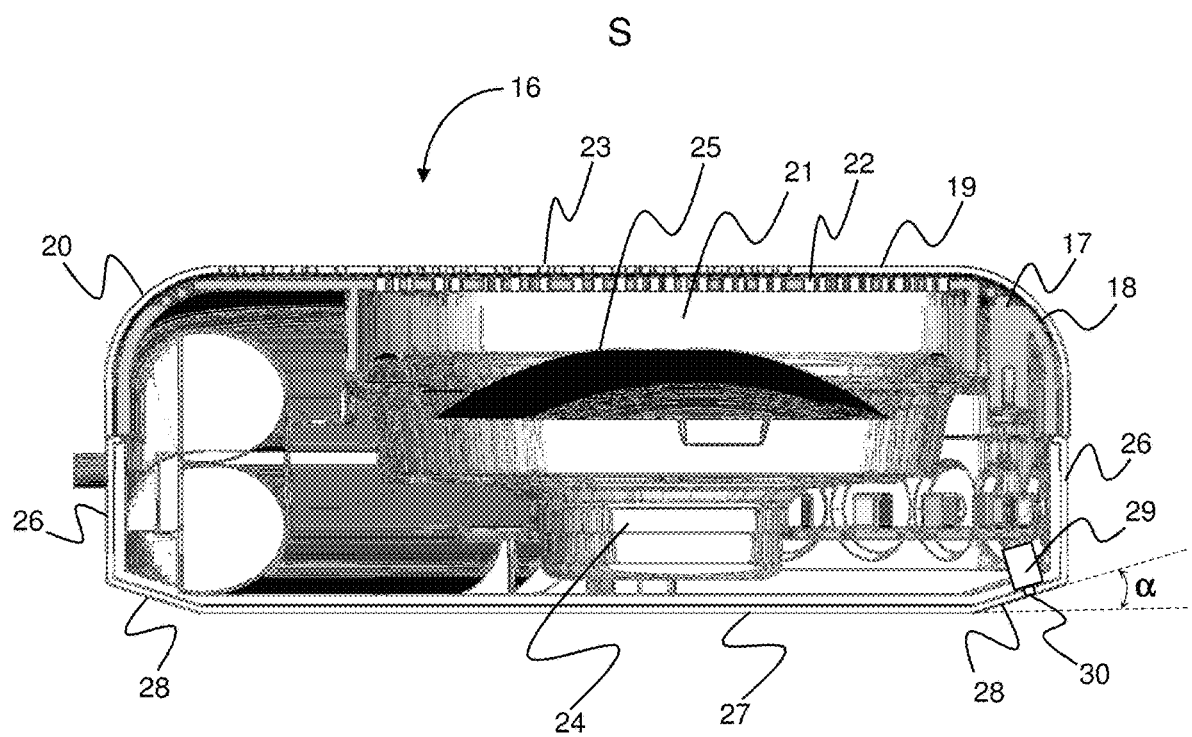
FIG. 2 shows a cross sectional side view of a device according to an exemplary embodiment.

Referring to FIG. 2 there is shown an embodiment of a device. The device 16 comprises a housing with a top portion 17, a side portion 26 and a bottom face 27. The housing accommodates a loudspeaker unit 24 with a diaphragm 25 configured to generate sound energy in a cavity 21 inside the housing. The cavity 21 is in acoustic communication with the surroundings S of the device for instance through suitable openings or channels 22 in a top portion 17 of the device. On the top portion 17 there is in this embodiment provided a cover 19 which is either provided with through openings or channels 22 configured to communicate with the corresponding openings or channels 22 in the top portion 17 of the housing or with a sound permeating material. It is understood that other means of acoustic communication between the cavity 21 and the surroundings S than the shown openings or channels 22 could be used, and such other means of acoustic communication would also fall within the scope of the present disclosure. Preferably, the housing is oval or round (as seen from a direction perpendicular to the top portion), such as in the embodiment shown in FIG. 3. Preferably, the housing is provided with rounded edge portions 18 of the top portion 17 and corresponding rounded portions 20 of the cover 19.

Opposite the top portion the device is provided with a bottom portion 27 that for instance could be substantially planar, such that it provides a stand for the device. At the edge portion between the bottom portion 27 and side portion 26 there is provided an inclined surface portion 28 connecting the bottom portion 27 with the side portion 26 of the housing. The inclined surface portion 28 forms an angle α with the surface of the bottom portion 27. The angle α is preferably less than approximately 45 degrees. Angle α can be less than approximately 40 degrees, 35 degrees, 30 degrees, 25 degrees, 20 degrees, 15 degrees, 10 degrees, 5 degrees, or the like.

Figure 3:
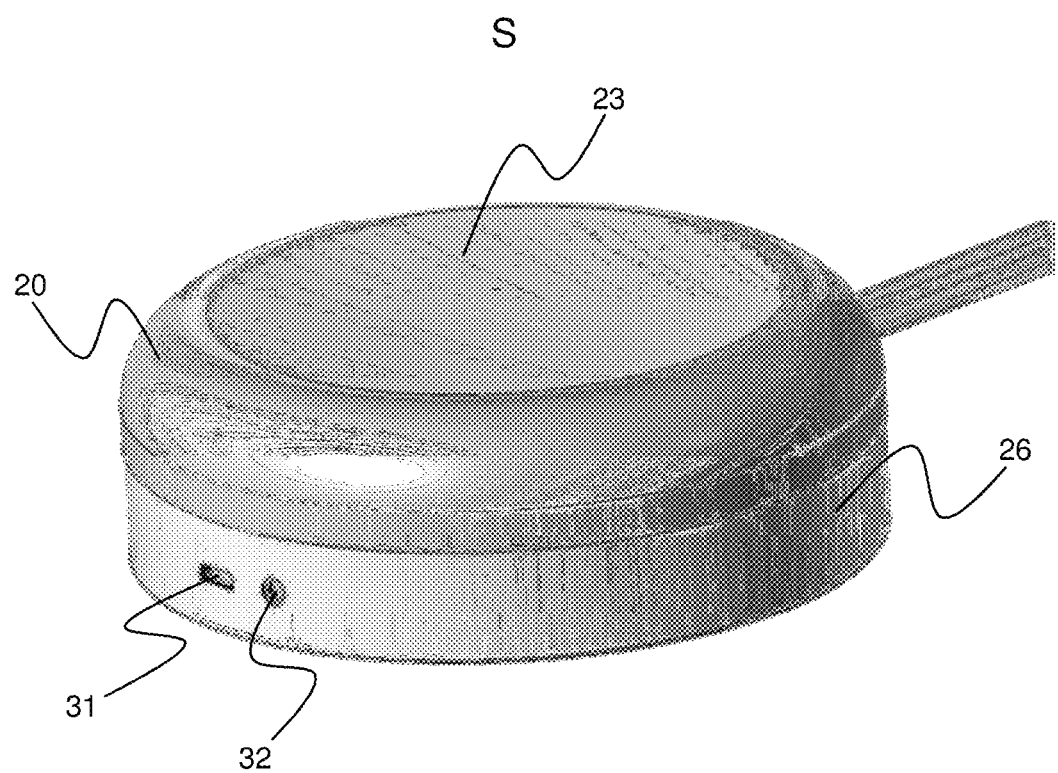
FIG. 3 shows a schematic perspective view of a device according to an exemplary embodiment.

Referring to FIG. 3 there is shown a schematic perspective view of an embodiment of the device. The shown embodiment is of a substantially circular shape as seen from above (towards the top portion 23) or from below (towards the bottom face 27), but—as mentioned above—other shapes, such as oval shapes, could also be used, and would also be covered by the claims. FIG. 3 shows the top portion 23 with its rounded edge portion 20, the side portion 26 and furthermore a USB connection 31 and an analogue connector 32 for instance configured to accept a mini jack connector of a head set.

Figure 4A:
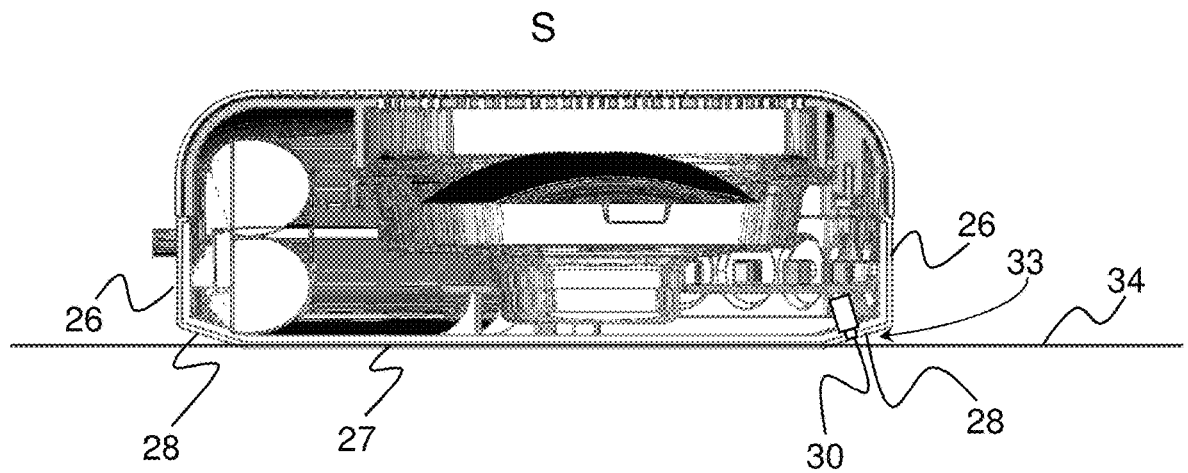
FIG. 4(a) shows a cross sectional side view of a device according to an exemplary embodiment.
Figure 4B:
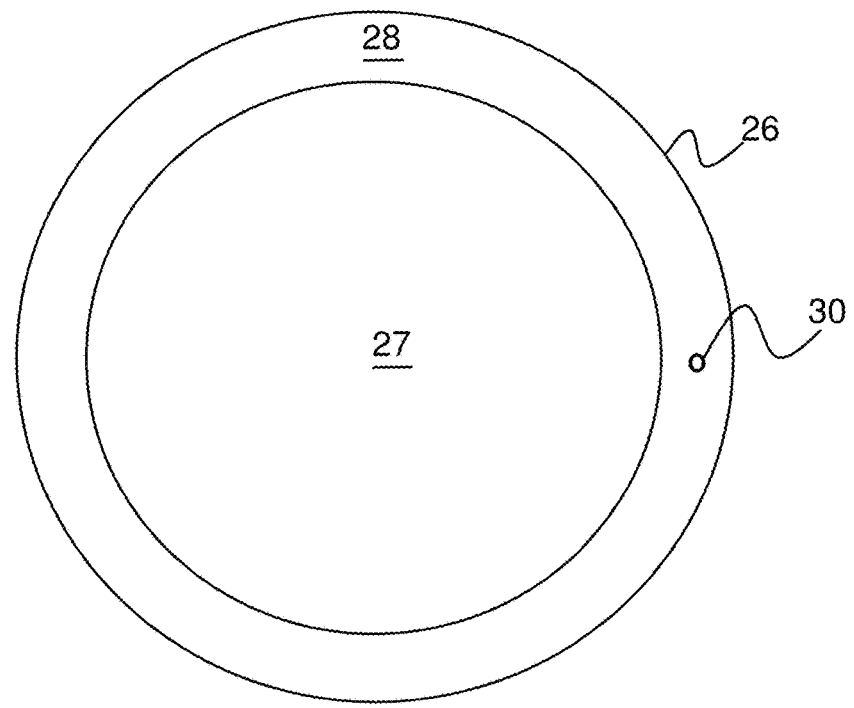
FIG. 4(b) shows a bottom view of a device according to an exemplary embodiment.

Referring to FIGS. 4(a) and 4(b) there is shown a schematic illustration of a possible shape of the inclined surface portion 28 connecting the bottom portion 27 with the side portion 26. In the embodiment shown in FIGS. 4(a) and 4(b), the inclined surface portion 28 extends around the entire bottom portion 27 of the housing, but it is understood that the inclined surface portion 28 may alternatively only extend over a more limited angular region along the bottom portion 27 and that such embodiments would also fall within the scope of the present disclosure. FIG. 4(a) further indicates a sound reception region 33 that is formed between the inclined surface portion 28 and a surface 34, such as a table top, upon which the device is standing during use.

Figure 5:
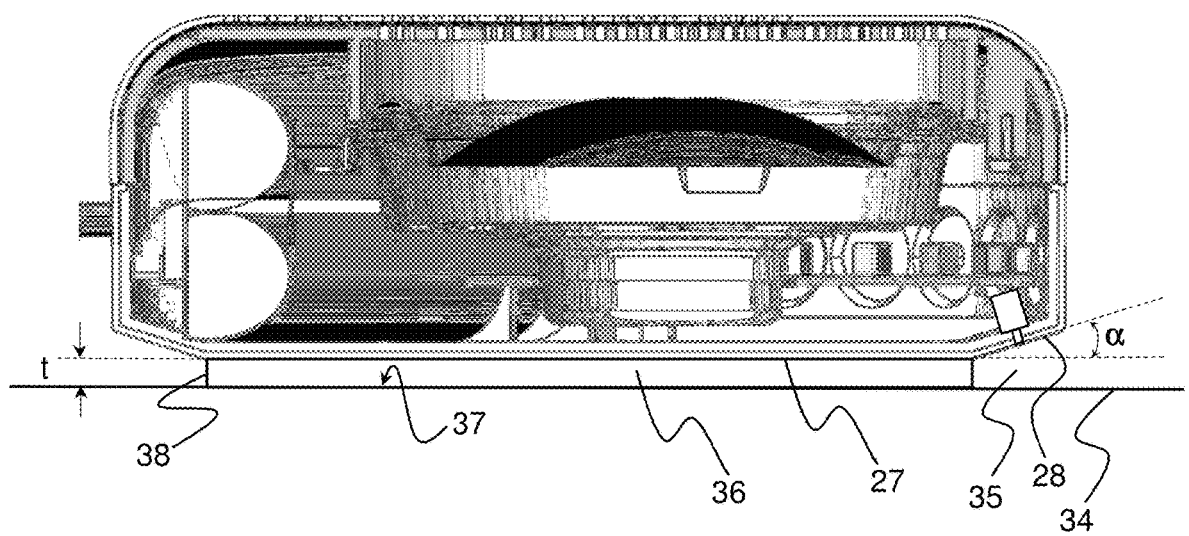
FIG. 5 shows a cross sectional side view of a device according to an exemplary embodiment.

Referring to FIG. 5 there is shown an alternative embodiment of the device with a modified sound reception region 35 at the bottom of the device. In this embodiment, the bottom portion 27 is extended downwards (as seen in FIG. 5) by a footing element 36 of thickness t, this element 36 having a bottom surface 37 that forms the contact surface between the device and the surface 34, such as a table top, and a side portion 38. In this embodiment, the sound reception region 35 is thus formed between the inclined surface portion 28, the side portion 38 of the footing element 36 and the underlying surface 34.

The device can be a wireless device being battery powered and/or adapted to perform wireless communication. The device can be configured to wirelessly transmit and receive output signals 10 and input signals 12. The device can be configured to communicate over a wireless connection, such as via Bluetooth, WiFi, IR communication, or the like.

Although the invention has been explained in relation to the embodiments described above, it is to be understood that many other possible modifications and variations can be made without departing from the scope of the present invention.

What is claimed is:

1. A device for radiating sound energy into the surroundings and receiving sound energy from the surroundings, the device comprising:
   a housing having a top portion, a side portion and a bottom portion;
   a loudspeaker unit provided in the top portion configured to generate sound energy in the surroundings of the device;
   a microphone having an inlet portion, wherein the microphone is configured to receive sound energy from a sound reception region in acoustic communication with said surroundings of the device;
   wherein said sound reception region is provided adjacent said bottom portion of the housing and partially bounded by an inclined surface portion of said housing, wherein said inclined surface portion faces away from said top portion, wherein said inclined surface portion extends circumferentially from the bottom portion, and wherein said inlet portion of the microphone is in acoustic communication with said inclined surface portion of the sound reception region, such that the sound energy can enter the microphone from the sound reception region.

2. The device of claim 1, wherein said inclined surface portion that faces away from said top portion forms an angle with the surface of the top portion, wherein said angle is greater than 90 degrees.

3. The device of claim 2, wherein said inclined surface portion is configured such that it connects the bottom portion with the side portion of the device.

4. The device of claim 2, wherein said inclined surface portion inclines at an angle α with the bottom portion, wherein angle α is less than approximately 45 degrees.

5. The device of claim 2, wherein said inlet portion of said microphone is provided in said inclined surface portion.

6. The device of claim 1, wherein said top portion is configured such that a cavity is formed in the housing, wherein said cavity is in acoustic communication with the surroundings of the device.

7. The device of claim 6, wherein said acoustic communication between the cavity and the surroundings is formed by a plurality of openings or channels through a portion of the top portion of the housing.

8. The device of claim 1, wherein said top portion is provided with a cover, a part of said cover corresponding to the openings or channels is made sound permeable.

9. The device of claim 2, wherein said inclined surface portion extends circumferentially the entire bottom portion.

10. The device of claim 2, wherein said inclined surface portion extends circumferentially around the bottom portion.

11. The device of claim 1, wherein the bottom portion is provided with a footing element extending a distance t outwardly from the bottom portion.

12. The device of claim 11, wherein t>0 and α is substantially equal to zero.

13. The device of claim 1 comprising at least two microphones having respective inlet portions, wherein said microphones are configured to receive sound energy from a sound reception region in acoustic communication with said surroundings of the device.

14. The device of claim 13, wherein said inlet portions of said at least two microphones are provided in said inclined surface portion.

15. A sound energy radiating system comprising at least two of the devices of claim 1, wherein the devices are configured such that the respective sound reception regions of the at least two devices are located relative to each other in such a manner that output signals from the respective microphones of the devices transmit a stereophonic or multi-channel signal that can be reproduced by means of a stereophonic or other multi-channel sound reproduction system at a reception region remote from the region in which said sound energy radiating system is provided.

16. The system of claim 15, wherein said multi-channel sound reproduction system at the reception region comprises two or more devices of claim 1, the devices of the multi-channel sound reproduction system configured to reproduce sound via at least one loudspeaker provided in said two or more devices.

17. The system of claim 15, wherein said devices are configured to transmit output signals from the respective microphones to said stereophonic or other multi-channel sound reproduction system at the reception region partly or completely by wireless communication means.

18. The device of claim 1 wherein said bottom portion comprises a base and the inclined surface portion and wherein said base and inclined surface portion are formed as a conical frustum.

19. The device of claim 18 wherein said base is a support to the housing.

* * * * *